(12) United States Patent
Kitamura

(10) Patent No.: US 9,914,597 B2
(45) Date of Patent: Mar. 13, 2018

(54) ARTICLE SUPPLY DEVICE FOR SUPPLYING ARTICLES ACCORDING TO TYPE

(71) Applicant: FANUC CORPORATION, Minamitsuru-gun, Yamanashi (JP)

(72) Inventor: Ryouji Kitamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 32 days.

(21) Appl. No.: 14/833,463

(22) Filed: Aug. 24, 2015

(65) Prior Publication Data

US 2016/0060045 A1 Mar. 3, 2016

(30) Foreign Application Priority Data

Aug. 27, 2014 (JP) ................ 2014-172972

(51) Int. Cl.
| | |
|---|---|
| *B65G 47/76* | (2006.01) |
| *B65G 47/90* | (2006.01) |
| *B65G 47/14* | (2006.01) |
| *B65G 47/52* | (2006.01) |
| *B65G 47/80* | (2006.01) |
| *B65G 47/88* | (2006.01) |
| *B65G 47/91* | (2006.01) |

(52) U.S. Cl.
CPC ......... *B65G 47/90* (2013.01); *B65G 47/1428* (2013.01); *B65G 47/525* (2013.01); *B65G 47/80* (2013.01); *B65G 47/8815* (2013.01); *B65G 47/91* (2013.01); *B65G 47/76* (2013.01); *B65G 2203/041* (2013.01)

(58) Field of Classification Search
CPC ............... B65G 47/1428; B65G 47/80; B65G 47/8815; B65G 47/525; B65G 2203/041; B65G 47/76; B07B 13/05; B65H 29/58
USPC .... 198/348, 434, 443, 451, 465.1, 530–532, 198/793, 800; 209/620–622, 630, 658, 209/941, 657
See application file for complete search history.

(56) References Cited

U.S. PATENT DOCUMENTS

| | | | | |
|---|---|---|---|---|
| 2,701,638 A | * | 2/1955 | Petro .................... | B65G 47/766 209/550 |
| 3,750,882 A | * | 8/1973 | Hays ...................... | B07C 5/342 198/341.03 |
| 5,372,233 A | * | 12/1994 | Fujino ................... | B65G 43/08 198/341.09 |

(Continued)

FOREIGN PATENT DOCUMENTS

| | | |
|---|---|---|
| JP | A 11-300670 | 11/1999 |
| JP | B 3876260 | 1/2007 |

*Primary Examiner* — Anna M Momper
*Assistant Examiner* — Ronald P Jarrett
(74) *Attorney, Agent, or Firm* — RatnerPrestia

(57) ABSTRACT

An article supply device includes a plurality of storage units in which a plurality of types of articles are respectively stored, a plurality of supply paths, a plurality of open/close stoppers that control the supply amounts of articles for each supply path, a plurality of partition/passing-through members that form gaps depending on the types of the articles, between the surfaces of the supply paths and the plurality of partition/passing-through members, and a driving unit that allows the supply paths and the partition/passing-through members to relatively move each other.

11 Claims, 14 Drawing Sheets

(56) References Cited

U.S. PATENT DOCUMENTS 5,760,343 A * 6/1998 Arimoto ................ G01G 19/42
177/145
6,471,044 B1 * 10/2002 Isaacs .................... B65G 43/08
198/347.4
8,322,515 B2 * 12/2012 Rausch ................ B65G 47/086
198/436

* cited by examiner

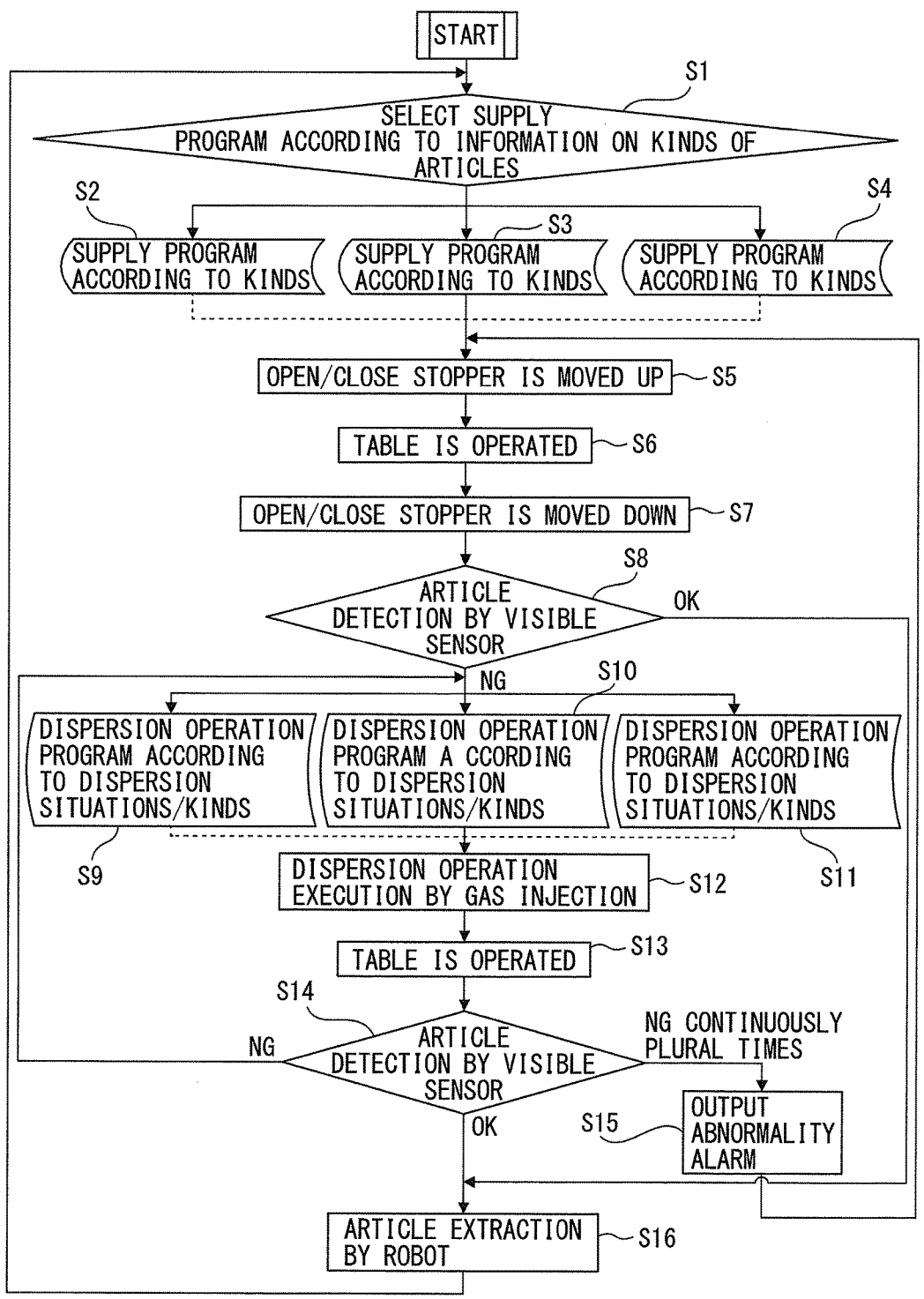

ARTICLE SUPPLY DEVICE FOR SUPPLYING ARTICLES ACCORDING TO TYPE

BACKGROUND OF THE INVENTION

1. Technical Field

The present invention relates to an article supply device that extracts articles according to type by using a visible sensor and a robot and supplies the articles to a supply destination.

2. Description of the Related Art

For example, in an assembly factory and the like, it is general that a robot grasps one of a plurality of articles on the basis of a visual sensor and supplies the article to a next supply destination. Japanese Registered Patent Publication No. 3876260 discloses a device including a rotatable table (a storage unit) having a mounting surface on which a plurality of types of articles are placed, and a partition/passing-through member that forms a gap of a predetermined distance between the mounting surface of the table and the partition/passing-through member. When the table and the partition/passing-through member relatively move with each other and thus an article passes through the gap, the visual sensor detects the article. Then, the robot grasps the article on the basis of information of the visual sensor and supplies the article to a supply destination.

However, when a plurality of types of articles are placed on the table, a situation in which desired types of articles do not always pass through the partition/passing-through member and only undesired types of articles pass through the partition/passing-through member may occur. In such a case, it is necessary to continuously allow the table and the partition/passing-through member to relatively move with each other until desired types of articles pass through the partition/passing-through member. As a consequence, a cycle time is delayed.

Furthermore, since the undesired types of articles having passed through the gap are not grasped by the robot, they return to the upstream of the partition/passing-through member as is by the rotation of the table. Therefore, the undesired types of articles reciprocate many times, resulting in the probability that the surfaces and the like of the undesired types of articles are damaged.

Therefore, it is an object of the present invention to provide an article supply device capable of supplying a plurality of types of articles in a short cycle time without the damage of the articles.

SUMMARY OF INVENTION

According to a first aspect in order o achieve the above-mentioned object, there is a provided an article supply device including a plurality of storage units in which a plurality of types of articles are respectively stored, a plurality of supply paths that respectively communicate with the plurality of storage units, a plurality of open/close stoppers that control supply amounts of articles, which are to be supplied from each of the plurality of storage units to each of the plurality of supply paths, for each supply path, a plurality of partition/passing-through members that form gaps depending on the types of the articles to be supplied to each of the plurality of supply paths, between surfaces of the supply paths and the plurality of partition/passing-through members at a downstream side of each of the plurality of open/close stoppers in a supply direction of the articles, and a driving unit that allows the plurality of supply paths and the plurality of partition/passing-through members to relatively move each other.

According to a second aspect, in the first aspect, at least one of type, positions, and orientations of the articles supplied to downstream of the plurality of partition/passing-through members is detected by a visible sensor.

According to a third aspect, in the first or the second aspect, the articles supplied to downstream of the plurality of partition/passing-through members are extracted by a robot.

According to a fourth aspect, in the first aspect, the article supply device further includes article stoppers provided to each of the plurality of supply paths at downstream of the plurality of partition/passing-through members and block the articles.

According to a fifth aspect, in any one of the first to fourth aspects, a plurality of pins, which are adjacent to front ends of the open/close stoppers, vertically juxtaposed with respect to surfaces of the supply paths, and a pin interfered with the article among the plurality of pins is configured to be moved up according to the article.

According to a sixth aspect, in the first aspect, the article supply device further includes a gas injection unit that injects gas to the articles on the supply path in at least one of upstream and downstream of the partition/passing-through members.

According to a seventh aspect, in the sixth aspect, a timing at which the gas injection unit injects the gas is controlled by a timer.

According to an eighth aspect, in the sixth aspect, a timing at which the gas injection unit injects the gas is controlled by a visible sensor that detects at least one of type, positions, and orientations of the articles supplied to downstream of the plurality of partition/passing-through members.

According to a ninth aspect, in the first aspect, the plurality of supply paths are configured to have a concentric arc type with each other.

According to a tenth aspect, in the first aspect, the plurality of supply paths are a plurality of linear conveyors juxtaposed to one another.

According to an eleventh aspect, in the first aspect, the driving unit is a servo motor.

These objects, features, and advantages of the present invention and other objects, features, and advantages will be better understood from the following detailed description of an exemplary embodiment of the present invention illustrated in the accompanying drawings.

BRIEF DESCRIPTION OF DRAWINGS

FIG. 5 is a flowchart illustrating an operation of an article supply device based on the present invention.

DETAILED DESCRIPTION

Figure 1:
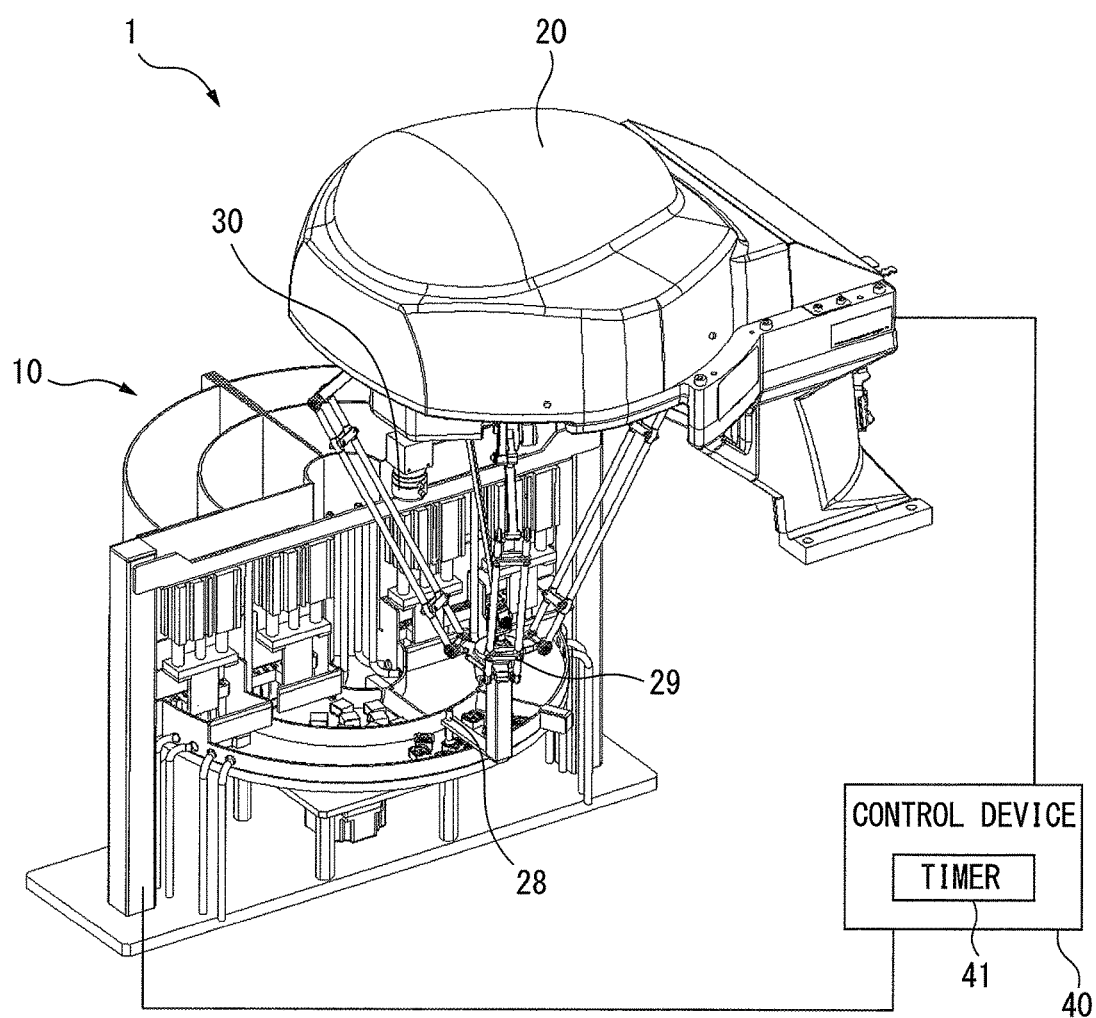
FIG. 1 is a perspective view of a system including an article supply device based on the present invention.

Hereinafter, an embodiment of the present invention will be described with reference to the accompanying drawings. In the following drawings, the same reference numerals are used to designate the same members. In order to facilitate understanding, scales of these drawings are appropriately changed.

FIG. 1 is a perspective view of a system including an article supply device based on the present invention. As illustrated in FIG. 1, a system 1 includes an article supply device 10, a robot 20, and a control device 40 that controls the article supply device 10 and the robot 20. In the present invention, it is assumed that a member 28 mounted in a movable unit 29 of the robot 20 grasps an article supplied from the article supply device 10 and supplies the article to another place.

The robot 20 illustrated in FIG. 1 is a parallel link robot that displaces the movable unit 29 by driving three arms below a base. However, other types of robots, for example, a vertical articulated robot may also be used as the robot 20.

Furthermore, a visible sensor 30 is mounted in the robot 20. The visible sensor 30 may be a CCD camera, or a combination of the CCD camera and a projector. The visible sensor 30 has a field of view partially including the upstream and the downstream of partition/passing-through members 15a to 15d to be described later in an article supply direction. The visible sensor 30 detects the kind, the position, the orientation and the like of an article in such a field of view.

The control device 40 illustrated in FIG. 1 is a digital computer and drives the article supply device 10 according to a predetermined program. Furthermore, the control device 40 drives the robot 20 on the basis of information from the visible sensor 30. As illustrated in FIG. 1, the control device 40 includes a timer 41. The timer 41 may also be directly connected to a gas injection unit 36 to be described later.

Figure 2:
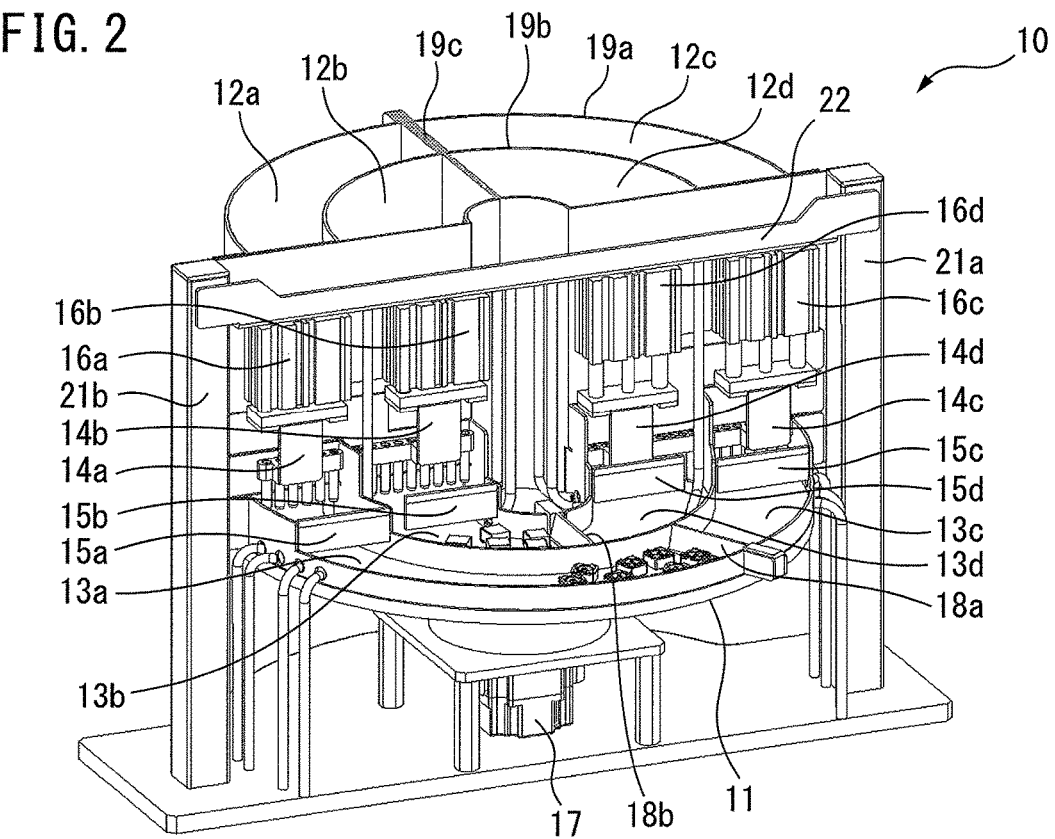
FIG. 2 is a perspective view of an article supply device based on the present invention.
Figure 3:
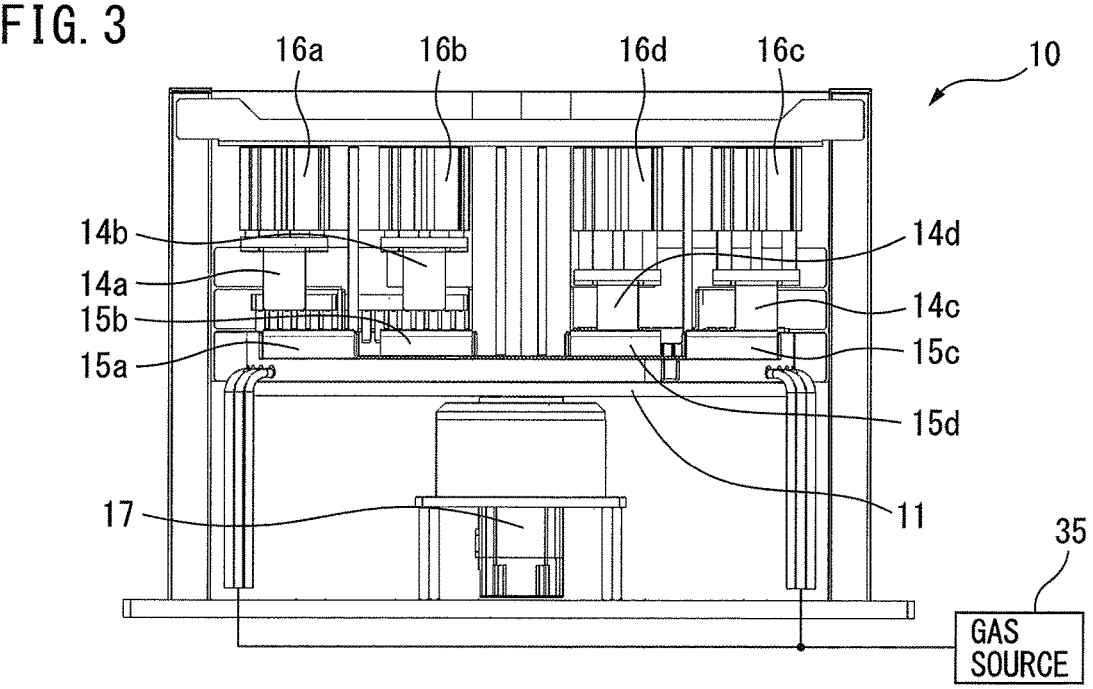
FIG. 3 is a side view of an article supply device illustrated in FIG. 2.
Figure 4:
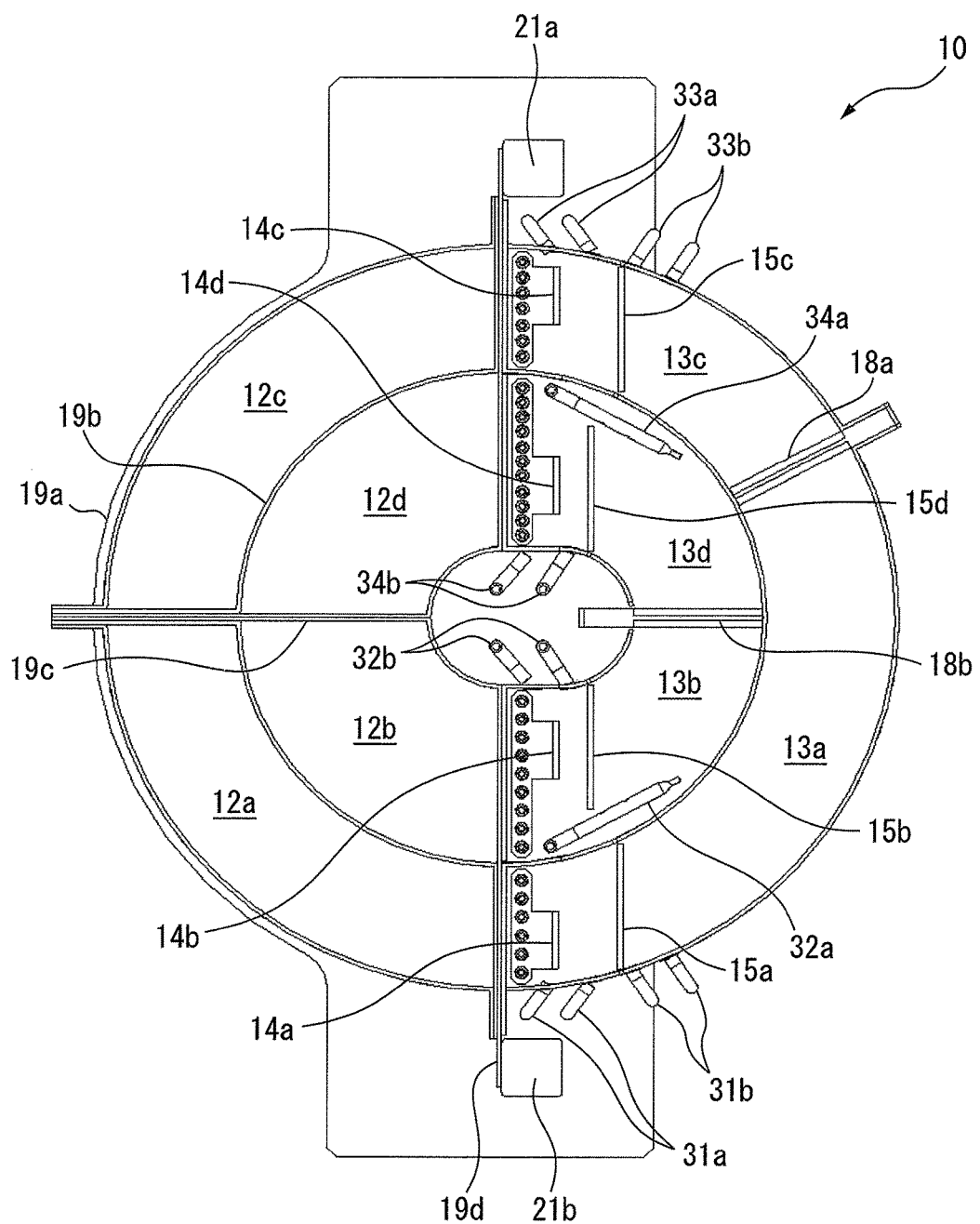
FIG. 4 is a sectional view of an article supply device illustrated in FIG. 2.

FIG. 2 is a perspective view of the article supply device based on the present invention, and FIG. 3 is a side view of the article supply device illustrated in FIG. 2. Moreover, FIG. 4 is a sectional view of the article supply device illustrated in FIG. 2. As illustrated in these drawings, the article supply device 10 has a circular table 11. An upper surface of the table 11 is a mounting surface on which a plurality of types of articles are placed.

The table 11 is rotated around a central axis of the table 11 by a driving motor 17 disposed on a lower surface thereof, for example, a servo motor. Since the servo motor is used, a rotation position of the table 11 is accurately controlled and the table 11 is rotated at a high speed. In addition, the table 11 is assumed to be rotated both clockwise and counterclockwise.

As apparent from FIG. 2, two struts 21a and 21b are installed adjacent to the table 11, and a beam 22 extending in a diametrical direction of the table 11 connects apexes of these struts 21a and 21b to each other. Moreover, the beam 22 is mounted at one side thereof with a first semicircular surrounding member 19a having a radius approximately equal to that of the table 11 and a second surrounding member 19b having a radius smaller than that of the first surrounding member 19a.

As apparent from FIG. 4, both the first surrounding member 19a and the second surrounding member 19b and the table 11 are concentrically disposed. Furthermore, a partition plate 19c extending vertically with respect to the beam 22 (not illustrated in FIG. 4) crosses the first surrounding member 19a and the second surrounding member 19b. The first surrounding member 19a is assumed to extend downward just before an outer edge of the table 11. Furthermore, the second surrounding member 19b and the partition plate 19c are assumed to extend downward just above the surface of the table 11.

As a consequence, the first surrounding member 19a, the second surrounding member 19b, the partition plate 19c, and a mounting plate 19d, which is mounted at one side of the struts 21a and 21b, forms a first storage unit 12a to a fourth storage unit 12d. In order to easily view the interiors of the first storage unit 12a to the fourth storage unit 12d, the first surrounding member 19a, the second surrounding member 19b, and the partition plate 19c are preferably made of a transparent resin plate and the like.

In first storage unit 12a to fourth storage unit 12d, different types of articles may be respectively stored. Alternatively, for example, one kind of articles may also be stored in the storage units 12a and 12b and other types of articles may also be stored in the storage units 12c and 12d. However, it is assumed that one kind of article is stored in one storage unit. A plurality of articles are randomly stacked and stored in each of the storage units 12a to 12d.

As particularly apparent from FIG. 4, the first storage unit 12a has a section extending in an arc shape, and the second storage unit 12b has an approximately quadrant section radially inside the first storage unit 12a. Similarly, the third storage unit 12c has a section extending in an arc shape, and the fourth storage unit 12d has an approximately quadrant section radially inside the third storage unit 12c. Furthermore, the third storage unit 12c and the fourth storage unit 12d are disposed to face the first storage unit 12a and the second storage unit 12b, respectively.

In FIG. 4, at the other side of the beam 22, a first supply path 13a to a fourth supply path 13d are illustrated on the mounting surface of the table 11 by guide units. These first supply path 13a to fourth supply path 13d communicate with the first storage unit 12a to the fourth storage unit 12d, respectively.

As apparent from FIG. 4, a first article stopper 18a is disposed between the first supply path 13a and the third supply path 13c. Similarly, a second article stopper 18b is disposed between the second supply path 13b and the fourth supply path 13d. One side of the first article stopper 18a blocks articles supplied to the first supply path 13a, and the other side of the first article stopper 18a blocks articles supplied to the third supply path 13c. Similarly, one side of the second article stopper 18b blocks articles supplied to the second supply path 13b, and the other side of the second article stopper 18b blocks articles supplied to the fourth supply path 13d. Furthermore, these article stoppers 18a and 18b play a role of preventing a certain kind of articles supplied to a certain supply path from being mixed with other types of articles supplied to another supply path.

As illustrated in FIG. 4, the first supply path 13a and the third supply path 13c have an arc shape including the outer edge of the table 11, and the second supply path 13b and the fourth supply path 13d have an arc shape and are concentrically positioned radially inside from the first supply path 13a and the third supply path 13c. As a consequence, terminations of the supply paths 13a to 13d serve as side portions of the two article stoppers 18a and 18b as illustrated in FIG. 4. In other words, in this case, the extraction positions of articles of each of the plurality of supply paths 13a to 13d can be aggregated to the article stoppers 18a and 18b, so that it is possible to miniaturize the article supply device 10.

In FIG. 4, the second article stopper 18b is disposed to extend in the same direction as that of the partition plate 19c, and the first article stopper 18a is disposed to extend in a direction different from that of the partition plate 19c. However, the first article stopper 18a may also extend in the same direction as that of the second article stopper 18b, or the first article stopper 18a and the second article stopper 18b may also extend in other directions.

Referring again to FIG. 2, at the other side of the beam 22, a first motor 16a to a fourth motor 16d are juxtaposed to one another. These first motor 16a to fourth motor 16d respectively move up a first open/close stopper 14a to a fourth open/close stopper 14d disposed above the first supply path 13a to the fourth supply path 13d. As will be described later, the first open/close stopper 14a to the fourth open/close stopper 14d play a role of respectively controlling the supply amounts of articles, which have been supplied to the first supply path 13a to the fourth supply path 13d, according to the supply paths.

In FIG. 2, the first partition/passing-through member 15a to the fourth partition/passing-through member 15d are respectively disposed in front of these first open/close stopper 14a to fourth open/close stopper 14d. As illustrated in FIG. 2, it is assumed that these partition/passing-through members 15a to 15d are mounted in guide units forming both edge portions of each of the first supply path 13a to the fourth supply path 13d.

These partition/passing-through members 15a to 15d are mounted so that a lower edge thereof forms a gap having a predetermined size between each of these partition/passing-through members 15a to 15d and the mounting surface of the table 11. The size (the height) of the gap is decided as a value by which articles supplied to a corresponding supply path pass through little by little according to the rotation of the table 11 and are dispersed as illustrated in the drawing. When the types of articles supplied to each of the first supply path 13a to the fourth supply path 13d are different from one another, the sizes (the heights) of the gaps of the partition/passing-through members 15a to 15d are also different from one another.

At the time of an operation, the table 11 is rotated clockwise or counterclockwise. In this way, different types of articles stored in each of the first storage unit 12a to the fourth storage unit 12d pass through each of the partition/passing-through members 15a to 15d little by little, for example, one by one, and are supplied to the downstream of these partition/passing-through members 15a to 15d.

Referring again to FIG. 1, when the visible sensor 30 detects articles having passed through each of the partition/passing-through members 15a to 15d, at least one of the type, the positions, and the orientations of such articles is supplied to the control device 40. Then, on the basis of such information, the control device 40 operates the robot 20, so that the member 28 of the robot 20 grasps one article. Then, the robot 20 conveys the article to a next supply destination.

Figure 6A:
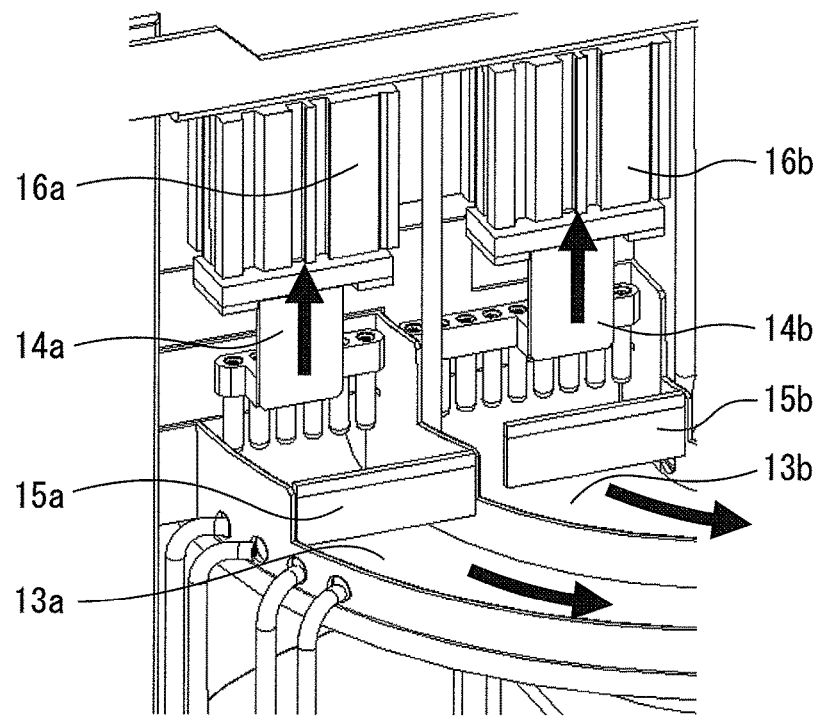
FIG. 6A is a first perspective view illustrating the flow of articles in an article supply device.
Figure 6B:
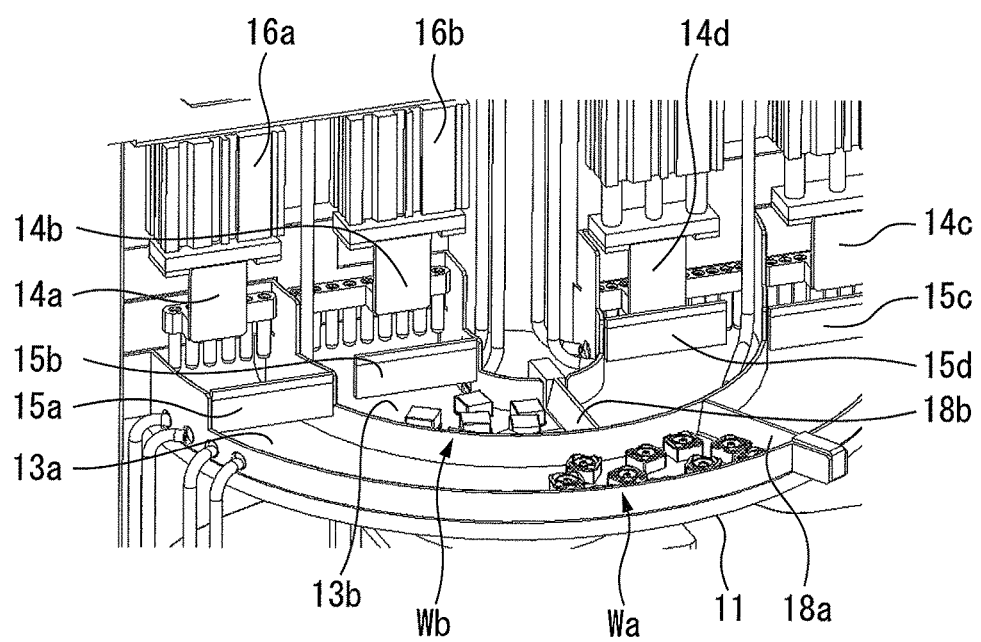
FIG. 6B is a second perspective view illustrating the flow of articles in an article supply device.
Figure 6C:
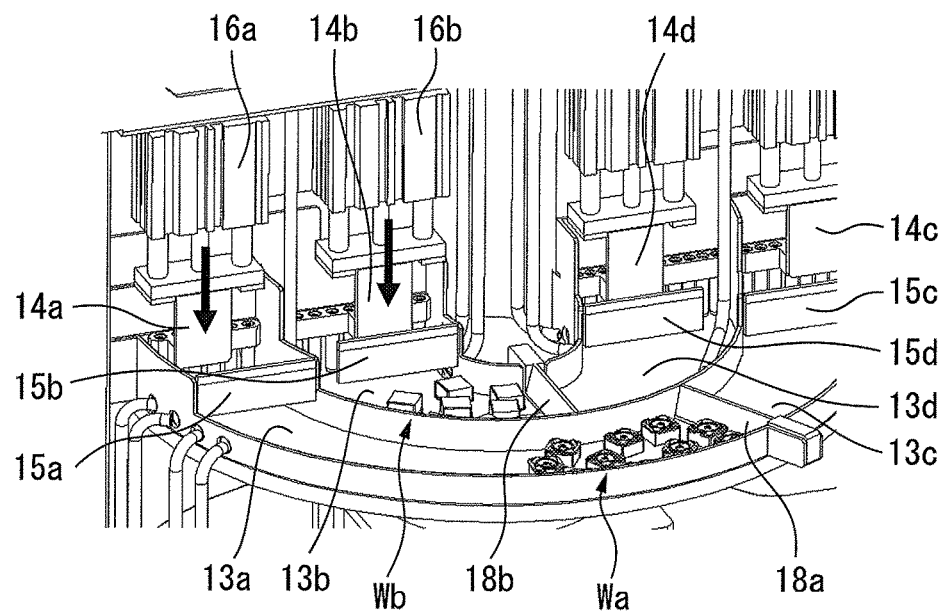
FIG. 6C is a third perspective view illustrating the flow of articles in an article supply device.

FIG. 5 is a flowchart illustrating an operation of the article supply device based on the present invention. This flowchart illustrates a one-time operation in which the robot 20 grasps an article and extracts the article from the article supply device 10. At the time of start of the procedure illustrated in FIG. 5, it is assumed that different types of articles have been stored in the storage units 12a to 12d. Moreover, FIG. 6A to FIG. 6C are perspective views illustrating the flow of articles in the article supply device. Hereinafter, the operation of the article supply device based on the present invention will be described with reference to these drawings.

Firstly, in step S1 of FIG. 5, a detection program is selected on the basis of information on the types of stored articles. The detection program decides an operation and a procedure in which articles are recognized by the visible sensor 30 and the types and positions (or positions and orientations) are detected, and FIG. 5 exemplifies three types (S2 to S4) of detection programs.

Herein, the detection program of S2, for example, is selected when articles Wa and another kind of articles Wb are respectively stored in the first storage unit 12a and the second storage unit 12b, the detection program of S3 is selected when different types of articles Wa to Wc are respectively stored in the first storage unit 12a to the third storage unit 12c, and the detection program of S4 is selected when different types of articles Wa to Wd are respectively stored in the first storage unit 12a to the fourth storage unit 12d. Hereinafter, the following description will be given on the assumption that the detection program of S2 has been selected.

Then, in step S5, the open/close stopper is moved up. In FIG. 6A, the first motor 16a and the second motor 16b are driven, so that each of the first open/close stopper 14a and the second open/close stopper 14b is moved up. The first open/close stopper 14a and the second open/close stopper 14b are sufficiently moved up such that the articles Wa and the articles Wb can respectively pass through the first supply path 13a and the second supply path 13b.

Then, in step S6, the driving motor 17 is driven, so that the table 11 is rotated in a predetermined direction, for example, counterclockwise, by a predetermined amount. In this way, the articles Wa and the articles Wb pass through the first open/close stopper 14a and the second open/close stopper 14b, respectively. Then, the articles Wa and articles Wb pass through the first and second partition/passing-through members 15a and 15b little by little, respectively.

As illustrated in FIG. 6B, when the number of each of the articles Wa and the articles Wb supplied to the front of the first article stopper 18a and the second article stopper 18b reaches a predetermined number, the procedure proceeds to step S7. In step S7, the first motor 16a and the second motor 16b are driven, so that each of the first open/close stopper 14a and the second open/close stopper 14b is moved down as illustrated in FIG. 6C.

The open/close stoppers 14a and 14b are sufficiently moved down such that the articles Wa and the articles Wb are not able to pass through the first supply path 13a and the second supply path 13b, respectively. In other words, the first supply path 13a and the second supply path 13b are closed by the open/close stoppers 14a and 14b, respectively. Therefore, even though the table 11 has further rotated counterclockwise, the articles Wa and the articles Wb are not supplied downstream from the open/close stoppers 14a and 14b.

The moving-down operations of the open/close stoppers 14a and 14b are individually controlled. Consequently, in the present invention, the supply amounts of different types of articles Wa and Wb can be individually controlled by the open/close stoppers 14a and 14b. Therefore, in the present invention, desired types of articles are supplied to the downstream of the partition/passing-through members 15a and 15b by a required number.

Figure 7A:
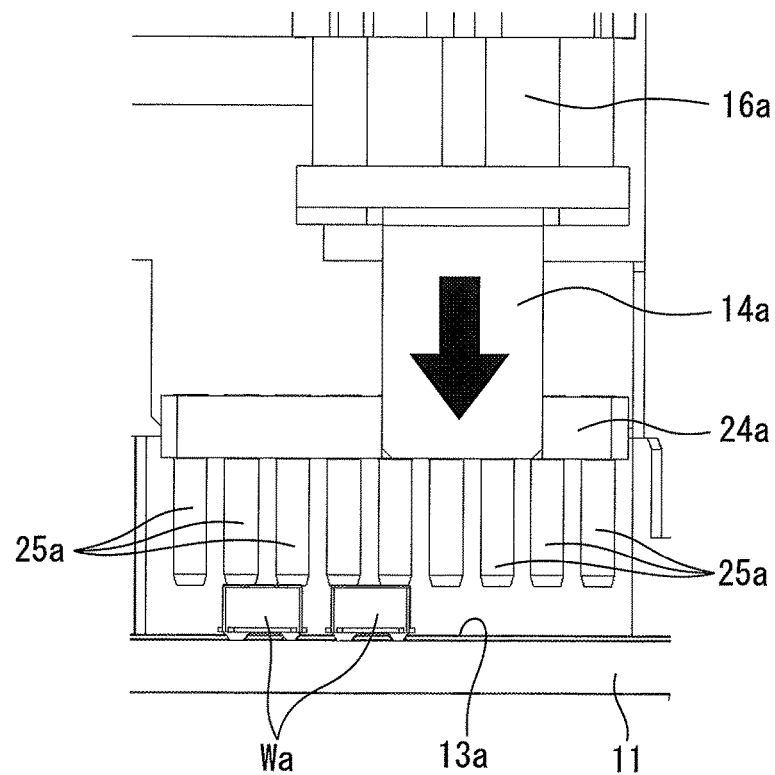
FIG. 7A is a first enlarged view of an open/close stopper.
Figure 7B:
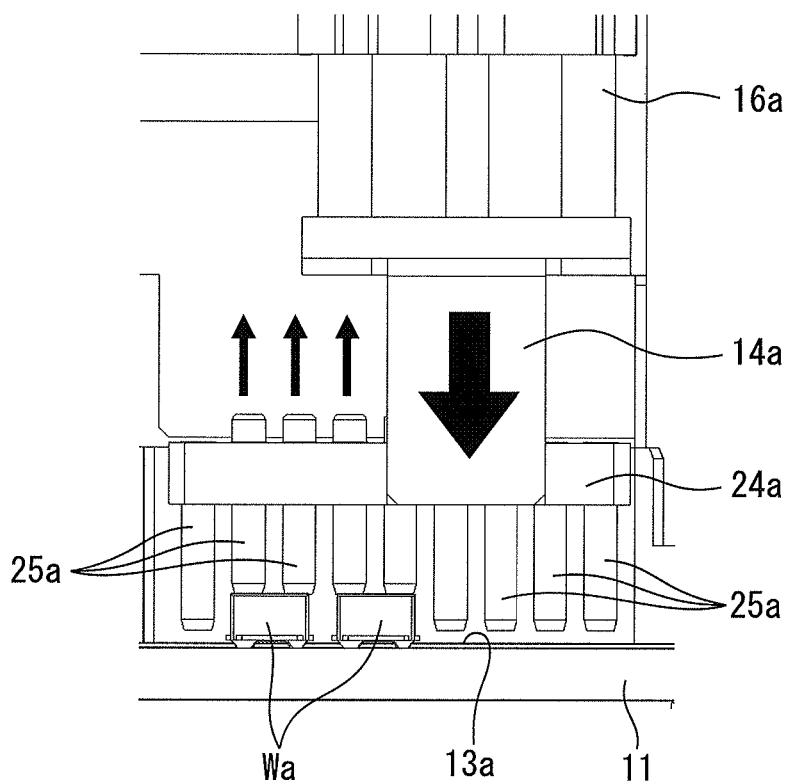
FIG. 7B is a second enlarged view of an open/close stopper.

Meanwhile, FIG. 7A and FIG. 7B are enlarged views of the open/close stopper. These drawings illustrate the first open/close stopper 14a, but the other open/close stoppers 14b to 14d are assumed to have a similar configuration. As illustrated in these drawings, a pin holding member 24a formed with a plurality of through holes and extending in a transverse direction is mounted at a front end of the first open/close stopper 14a, The length of the pin holding member 24a is approximately equal to the width of the first supply path 13a.

Furthermore, as illustrated in FIG. 7A and the like, a plurality of pins 25a are inserted into the plurality of through holes of the pin holding member 24a. Since a holding mechanism (not illustrated) is provided at upper ends of the pins 25a, these pins 25a are suspended down from upper edges of the through holes. Therefore, the pin holding member 24a and the plurality of pins 25a suspended down from the pin holding member 24a have a comb-like external appearance. These pins 25a can freely slide in the through holes. However, since the aforementioned holding mechanism is provided, the pins 25a do not pass through the through holes and fall from the pin holding member 24a.

There is a case in which when the first open/close stopper 14a is moved down, one or a plurality of articles Wa are positioned just below the pin holding member 24a. In such a case, one or a plurality of pins 25a positioned corresponding to the articles Wa are brought into contact with the upper surfaces of the articles Wa as illustrated in FIG. 7A.

Then, when the first open/close stopper 14a is further moved down, the pins 25a positioned corresponding to the articles Wa are moved up as illustrated in FIG. 7B. Since the table 11 is continuously rotated, the articles Wa illustrated in FIG. 7B can pass through below the first open/close stopper 14a before the first open/close stopper 14a is completely moved down. Then, when the articles Wa pass through, the aforementioned pins 25a are suspended down from the pin holding member 24a again.

In other words, in the present invention, pins interfered with articles Wa among the plurality of pins 25a are moved up according to the supply of articles Wa. According to such a configuration, the articles Wa do not directly receive thrust by which the first open/close stopper 14a is moved down. Consequently, the surfaces and the like of these articles Wa are prevented from being damaged.

Thereafter, when the first open/close stopper 14a is further moved down, a distance between the front ends of the plurality of pins 25a and the surface of the table 11 is smaller than the heights of the articles Wa. In this case, even through the table 11 is further rotated, since the plurality of pins 25a of the first open/close stopper 14a block the first supply path 13a, other articles Wa are not supplied downstream from the first open/close stopper 14a. In addition, in order to block the first supply path 13a, it is apparent that the first open/close stopper 14a and the pin holding member 24a are not needed to always reach the surface of the first supply path 13a.

Referring again to FIG. 5, in step S8, the visible sensor 30 detects one article Wa of the articles Wa having passed through the first partition/passing-through member 15a. When the kind, the position, the orientation and the like of an article are normally detected by the visible sensor 30, the procedure proceeds to step S16. In step S16, the robot 20 is operated on the basis of the detection result of the visible sensor 30, thereby grasping an article and conveying the article to a next supply destination.

In the present invention, the visible sensor 30 detects the kind, the position, the orientation of an article, so that it is possible to exclude a mechanism for positioning an article. Consequently, in the present invention, it is possible to simplify the entire configuration of the system 1. Furthermore, since articles are grasped using the robot 20, even though the extraction positions and orientations of the articles are changed according to articles, it is possible to flexibly cope with such a change.

In this connection, there is a case in which when a plurality of articles are supplied while being brought into contact with one another or being adjacent to one another, the visible sensor 30 is not able to correctly detect individual articles. Furthermore, there is a case in which articles mesh with other articles according to the shapes of articles and these articles overlap one another. Also in such a case, the visible sensor 30 is not able to correctly detect individual articles. Moreover, it is possible that a plurality of meshed articles may be clogged in the gaps between the partition/passing-through members 15a to 15d and the table 11. In the present invention, in order to solve such a problem, gas is injected to a plurality of objects brought into contact with one another or adjacent to one another and a plurality of meshed objects so as to disperse the plurality of articles and release the meshing, so that the visible sensor 30 normally operates.

Referring again to FIG. 4, four nozzles 31a and 31b are sequentially disposed at an outer peripheral portion of the first supply path 13a. As apparent from FIG. 4, the two nozzles 31a are disposed toward the first partition/passing-through member 15a between the first open/close stopper 14a and the first partition/passing-through member 15a. The other two nozzles 31b are disposed toward the first partition/passing-through member 15a at a downstream side of the first partition/passing-through member 15a.

Similarly, four nozzles 33a and 33b are sequentially disposed at an outer peripheral portion of the third supply path 13c. As apparent from FIG. 4, the two nozzles 33a are disposed toward the third partition/passing-through member 15c between the third open/close stopper 14c and the third partition/passing-through member 15c. The other two nozzles 33b are disposed toward the third partition/passing-through member 15c at the downstream of the third partition/passing-through member 15c.

Moreover, two nozzles 32b are sequentially disposed on an inside inner peripheral surface of the second supply path 13b. These nozzles 32b are disposed toward the second partition/passing-through member 15b between the second open/close stopper 14b and the second partition/passing-through member 15b. Moreover, a gas supply cylindrical unit 32a is disposed on an outside inner peripheral surface of the second supply path 13b. Two nozzle holes formed in the gas supply cylindrical unit 32a are disposed toward the second partition/passing-through member 15b at the downstream of the second partition/passing-through member 15b.

Similarly, two nozzles 34b are sequentially disposed on an inside inner peripheral surface of the fourth supply path 13d. These nozzles 34b are disposed toward the fourth partition/passing-through member 15d between the fourth open/close stopper 14d and the fourth partition/passing-through member 15d. Moreover, a gas supply cylindrical unit 34a is disposed on an outside inner peripheral surface of the fourth supply path 13d. Two nozzle holes formed in the gas supply cylindrical unit 34a are disposed toward the fourth partition/passing-through member 15d at the downstream of the fourth partition/passing-through member 15d.

These nozzles and gas supply cylindrical units are connected to a common gas source 35 illustrated in FIG. 3. In addition, the nozzles and the gas supply cylindrical units will be collectively and appropriately called the gas injection unit 36. These nozzles and nozzle holes are assumed to inject gas in parallel with the table 11. Preferably, the heights of the upper edges of the nozzles and the nozzle holes from the table 11 are approximately equal to the upper edges of articles placed on the table 11.

Referring again to FIG. 5, in step S8, when the visible sensor 30 is not able to appropriately detect the articles Wa, the grasping operation and the conveying operation of the robot 20 are not performed. In this case, on the basis of the types and positions of articles, one of a plurality of programs for gas injection is selected and executed.

In FIG. 5, three types of programs S9 to S11 are illustrated. These programs cause the gas injection unit 36 to perform an operation for moving articles within the field of view of the visible sensor 30 such that the detection of the articles by the visible sensor 30 can be normally performed according to the types and positions of the articles. In other words, these programs operate the gas injection unit 36 such that a plurality of articles brought into contact with one another or adjacent to one another are dispersed and a plurality of meshed articles are separated from one another.

Figure 8A:
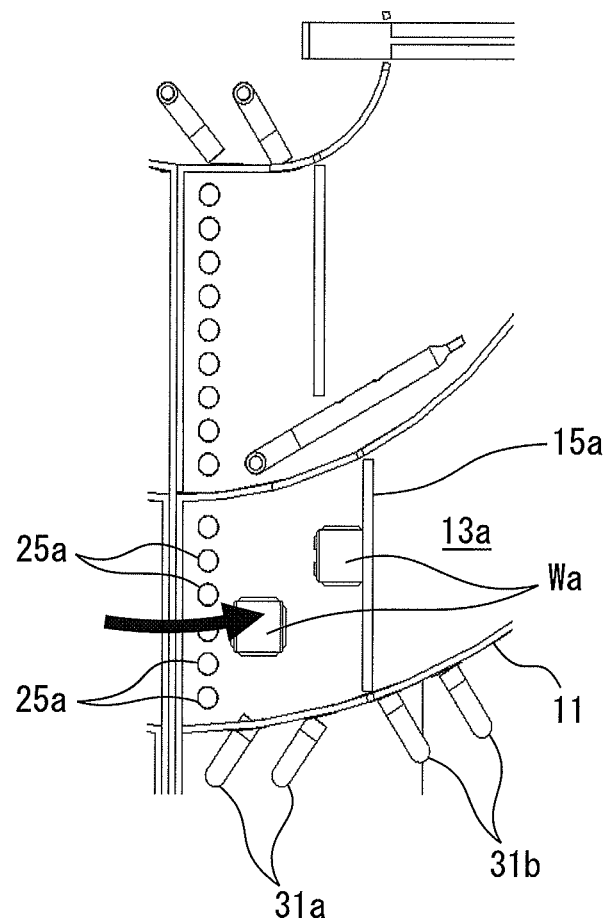
FIG. 8A is a first top view of a supply path at a radial outside.
Figure 8B:
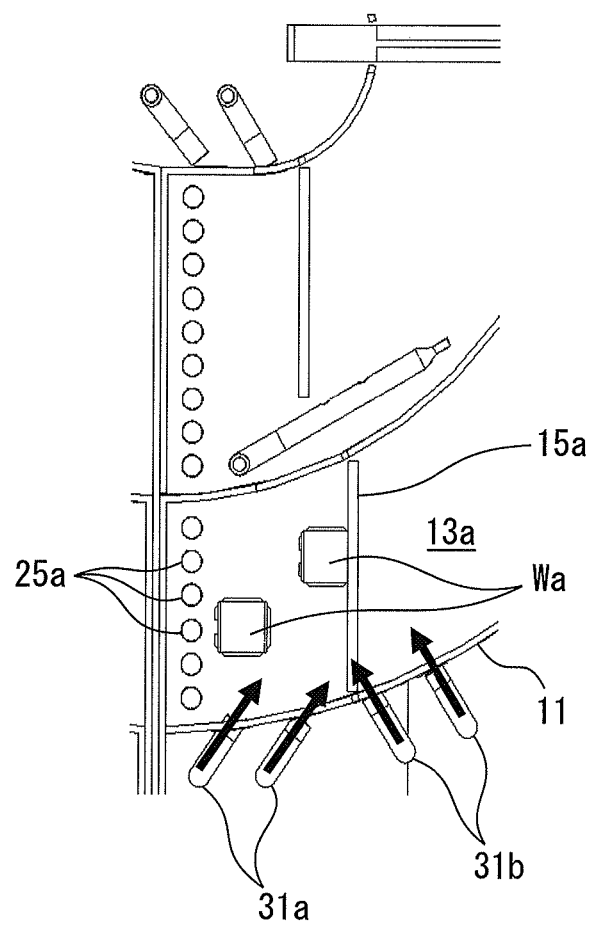
FIG. 8B is a second top view of a supply path at a radial outside.
Figure 8C:
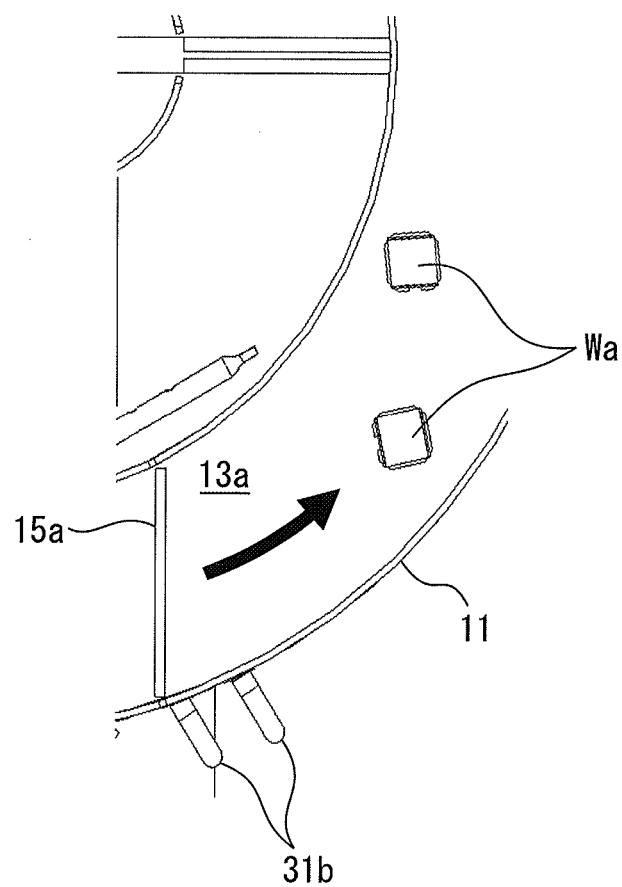
FIG. 8C is a third top view of a supply path at a radial outside.
Figure 9A:
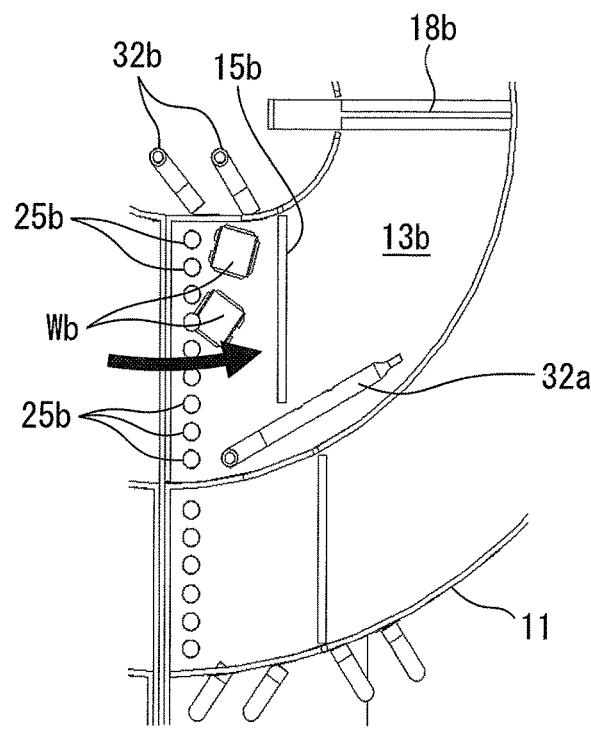
FIG. 9A is a first top view of a supply path at a radial inside.
Figure 9B:
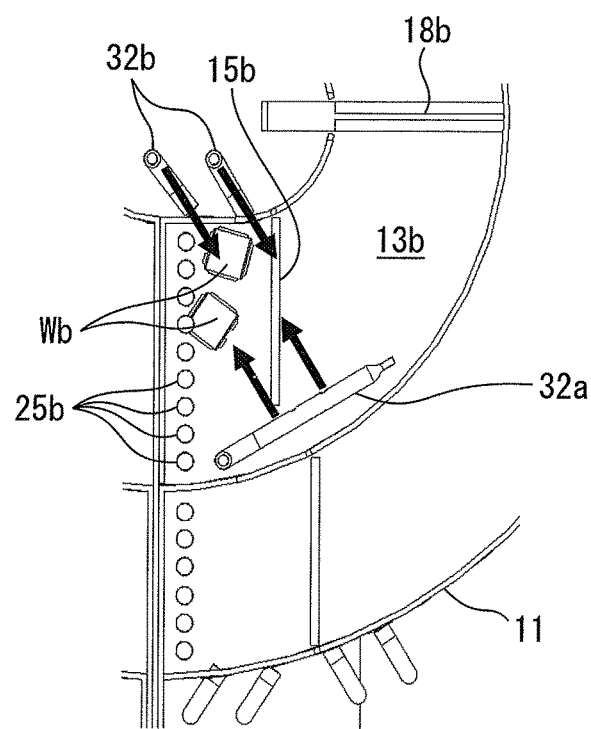
FIG. 9B is a second top view of a supply path at a radial inside.
Figure 9C:
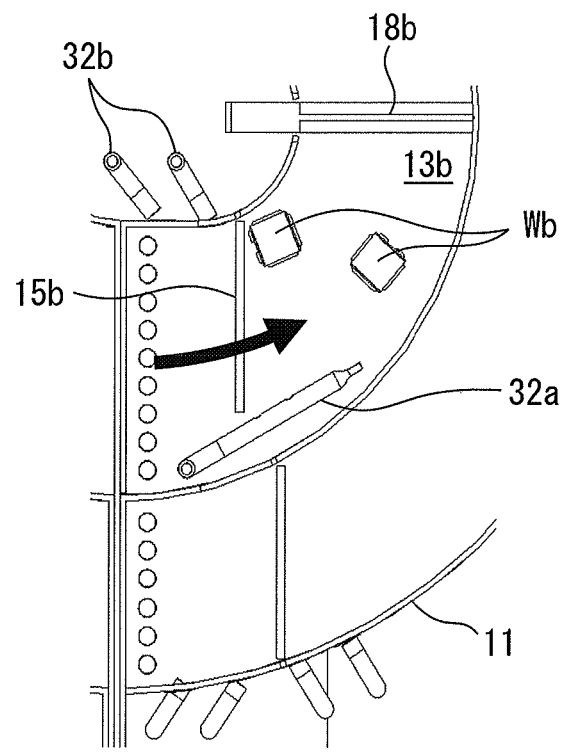
FIG. 9C is a third top view of a supply path at a radial inside.

Furthermore, in step S12, on the basis of the selected program, the gas injection unit 36 injects gas. FIG. 8A to FIG. 8C are top views of a supply path at a radial outside, for example, the first supply path 13a, and FIG. 9A to FIG. 9C are top views of a supply path at a radial inside, for example, the second supply path 13b. Hereinafter, with reference to these drawings, a scheme for dispersing a plurality of articles adjacent to one another will be described.

As illustrated in FIG. 8A, by the rotation of the table 11, a plurality of articles Wa adjacent to each other are supplied to an area between the first open/close stopper 14a (only the pins 25a are illustrated) and the first partition/passing-through member 15a.

Furthermore, as illustrated in FIG. 8B, gas is simultaneously or alternately supplied from the nozzles 31a and the nozzles 31b. In this way, as illustrated in FIG. 8C, the plurality of articles Wa are spaced apart from each other and are supplied downstream from the first partition/passing-through member 15a. In other words, the gas is injected, so that the plurality of articles Wa are dispersed. In addition, since gas injection in the third supply path 13c is approximately similar to the case of the first supply path 13a, a description thereof will be omitted.

Furthermore, as illustrated in FIG. 9A, by the rotation of the table 11, a plurality of articles Wb adjacent to each other are supplied to an area between the second open/close stopper 14b (only the pins 25b are illustrated) and the second partition/passing-through member 15b.

Furthermore, as illustrated in FIG. 9B, gas is simultaneously or alternately supplied from the nozzle holes of the gas supply cylindrical unit 32a and the nozzles 32b. In this way, as illustrated in FIG. 9C, the plurality of articles Wb are spaced apart from each other and are supplied downstream from the second partition/passing-through member 15b. In other words, the gas is injected, so that the plurality of articles Wb are dispersed. In addition, since gas injection in the fourth supply path 13d is approximately similar to the case of the second supply path 13b, a description thereof will be omitted. Furthermore, in this case, it is sufficient if nozzles or nozzle holes of any one of the upstream or the downstream of the partition/passing-through member 15a are used.

Figure 10A:
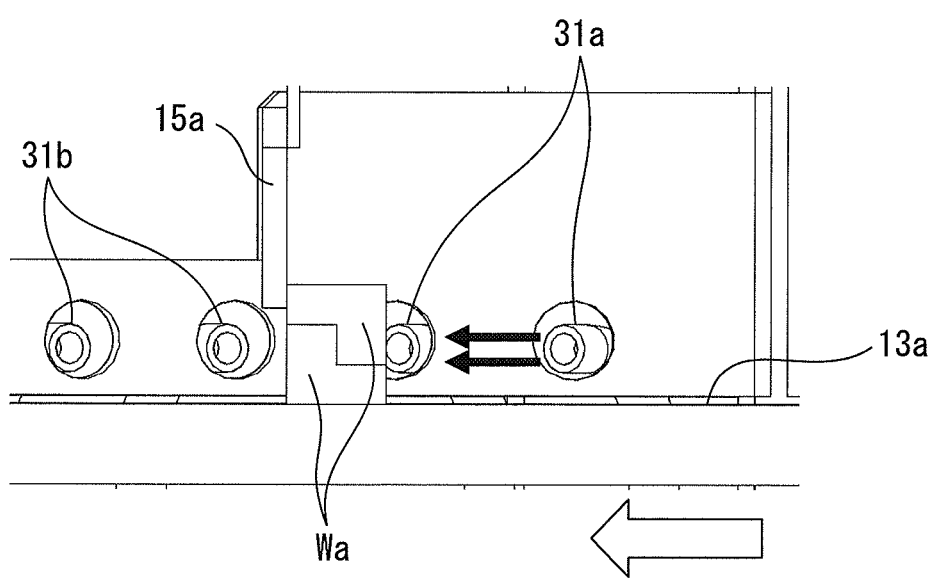
FIG. 10A is a first side view illustrating an operation of a gas injection unit.
Figure 10B:
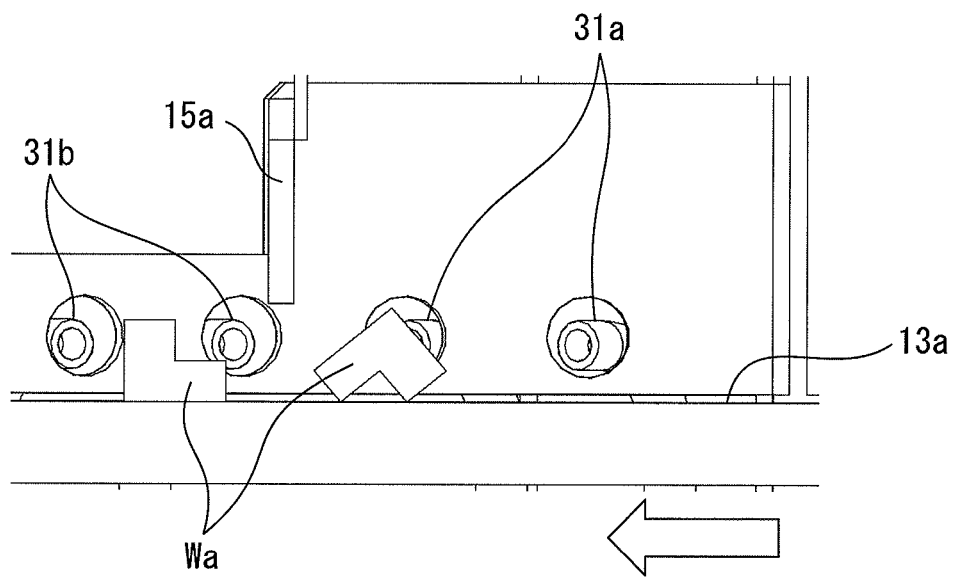
FIG. 10B is a second side view illustrating an operation of a gas injection unit.
Figure 11A:
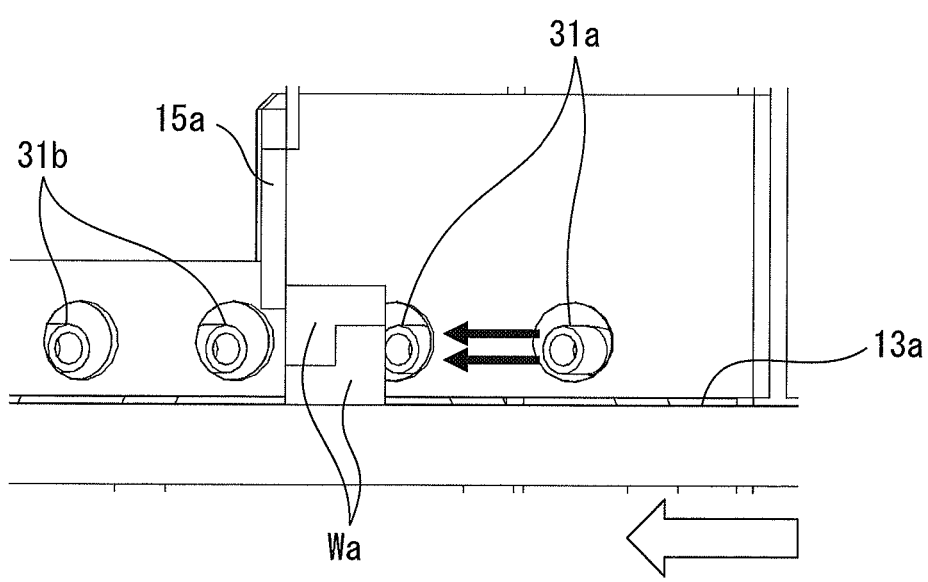
FIG. 11A is a first side view illustrating another operation of a gas injection unit.
Figure 11B:
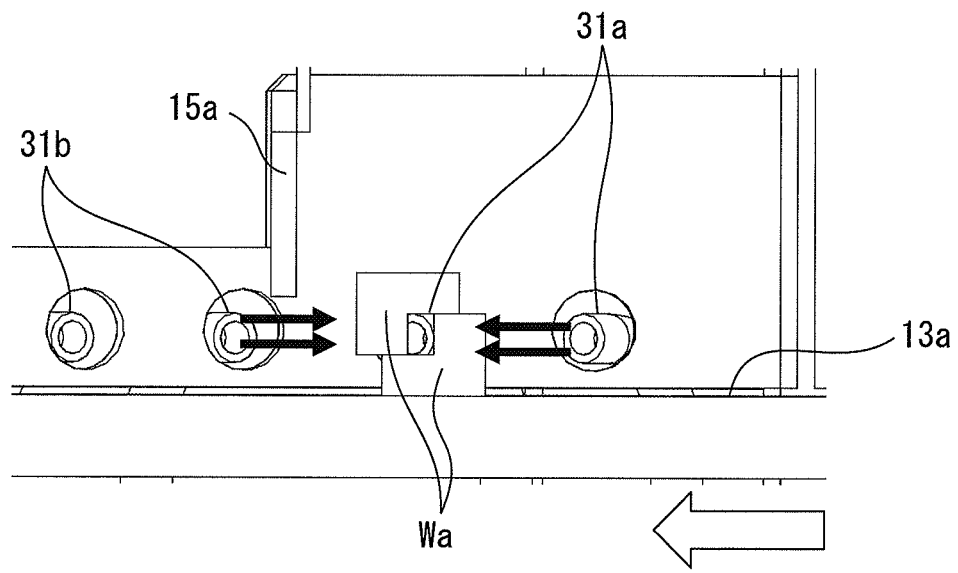
FIG. 11B is a second side view illustrating another operation of a gas injection unit.
Figure 11C:
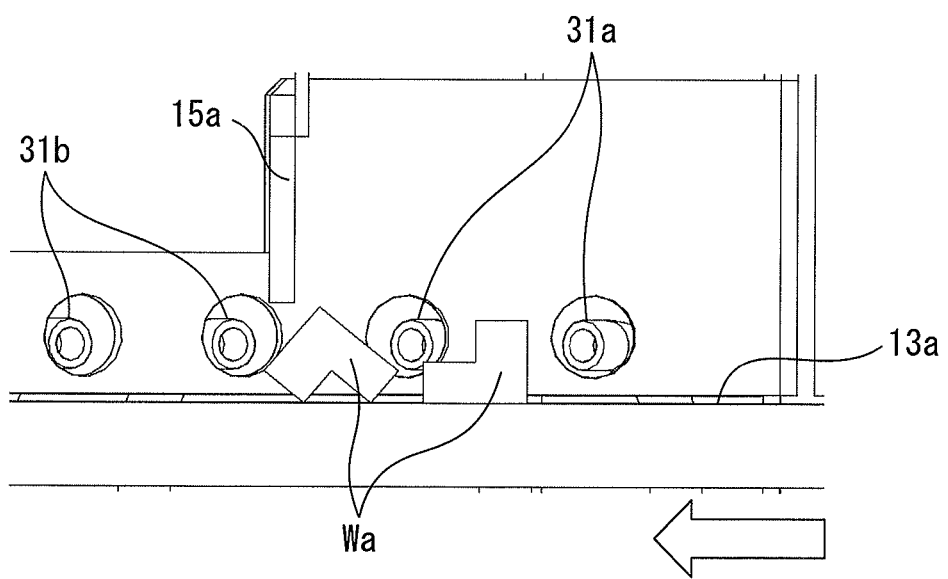
FIG. 11C is a third side view illustrating another operation of a gas injection unit.

Moreover, FIG. 10A and FIG. 10B are side views illustrating an operation of the gas injection unit, and FIG. 11A to FIG. 11C are side views illustrating another operation of the gas injection unit. Hereinafter, with reference to these drawings, a scheme for separating a plurality of meshed objects in the first supply path 13a from each other will be described. Furthermore, in these drawings, it is assumed that articles are supplied from the right side to the left side as indicated by white arrows. In addition, approximately similar operations are also performed in the other supply paths 13b to 13d.

In FIG. 10A, two articles Wa each having an approximately L shaped section are meshed with each other to form an approximately rectangular parallelepiped. As illustrated in FIG. 10A, each of these articles Wa has two external surfaces vertical to each other, and an intersection of these external surfaces is approximately vertical to the article supply direction. Furthermore, as illustrated in FIG. 10A, the aforementioned intersection of the article Wa positioned at a lower side is positioned at a downstream side of the supply direction from the aforementioned intersection of the other article Wa positioned at an upper side.

As apparent from FIG. 10A, the height of the two meshed articles Wa is higher than the gap between the first partition/passing-through member 15a and the table 11. Consequently, since the two meshed articles Wa do not pass through the gap, the two meshed articles Wa are not supplied downstream from the first partition/passing-through member 15a.

In such a case, gas is configured to be injected only from the nozzles 31a of an upstream side. In this way, the gas mainly collides with one external surface of the article Wa positioned at the upper side. In this way, as illustrated in FIG. 10B, the two meshed articles Wa are separated from each other. In addition, in such a case, since it is not necessary to use the nozzles 31b of a downstream side, the nozzles 31b of the downstream side may also be excluded.

Moreover, also in FIG. 11A, two articles Wa each having an approximately L shaped section are meshed with each other to form an approximately rectangular parallelepiped. Also in this case, an intersection of external surfaces of these articles Wa is approximately vertical to the article supply direction. However, the aforementioned intersection of the article Wa positioned at a lower side is positioned at an upstream side of the supply direction from the aforementioned intersection of the article Wa positioned at an upper side. As apparent from FIG. 11A, the two meshed articles Wa do not pass through the gap between the first partition/passing-through member 15a and the table 11.

In such a case, as illustrated in FIG. 11B, gas is alternately injected from the nozzles 31a of the upstream side and the nozzles 31*b* of the downstream side. When such injection is repeated by a plurality of number of times, a gap can be gradually generated between the two articles Wa. Finally, as illustrated in FIG. 11C, the two meshed articles Wa are separated from each other.

As described above, gas is injected, so that a plurality of objects brought into contact with each other or adjacent to each other are spaced apart from each other and a plurality of meshed objects are separated from each other. Referring again to FIG. 5, in step S13, the table 11 is further rotated by a predetermined amount, so that articles spaced apart from each other or objects separated from each other pass through the gap of the first partition/passing-through member 15*a* (see FIG. 8C, FIG. 9C, FIG. 10B, and FIG. 11C).

The operations of the gas injection unit 36 illustrated in FIG. 8A to FIG. 8C, FIG. 9A to FIG. 9C, FIG. 10A and FIG. 10B, and FIG. 11A to FIG. 11C are performed when the visible sensor 30 has detected a plurality of articles brought into contact with each other or adjacent to each other and a plurality of meshed articles. Alternatively, another sensor (not illustrated) provided between the open/close stoppers 14*a* and 14*d* and the partition/passing-through members 15*a* to 15*d* may also detect the plurality of articles. As described above, when the gas injection unit 36 is operated on the basis of the detection result of the visible sensor 30 or the other sensor, the injection amount of gas is minimized. Furthermore, simultaneously the injection of gas, the table 11 may be rotated in a single direction or a bi-direction by a small amount, thereby assisting the dispersion of articles. Consequently, in the present invention, it is possible to shorten a cycle time.

Alternatively, the timing at which the gas injection unit 36 injects gas may also be controlled using the timer 41 illustrated in FIG. 1. In detail, an operation for injecting gas for a predetermined injection time after a predetermined waiting time is repeated. In this case, since it is not necessary to use the detection result of a sensor in order to inject gas, it is possible to simplify the entire configuration of the system 1.

Referring again to FIG. 5, in step S14, the visible sensor 30 detects again one article Wa of the articles Wa having passed through the first partition/passing-through member 15*a*. When the gas injection process in step S12 has been performed, a plurality of objects have been spaced apart from each other or have been separated from each other. In such a case, in step S14, the visible sensor 30 normally operates. Since an article exists within the field of view of the visible sensor 30, when the visible sensor 30 has recognized the article to normally detect the kind, the position, the orientation and the like thereof, an extraction operation of the robot 20 is performed on the basis of the information of the visible sensor 30 (step S16)

Furthermore, in step S14, when the visible sensor 30 is not able to detect again one article Wa of the articles Wa having passed through the first partition/passing-through member 15*a*, the procedure proceeds to step S15. As described above, when the visible sensor 30 is not able to detect the article Wa continuously twice, an abnormality alarm is output in step S15. In this way, an operator recognizes that there is abnormality in the system. In addition, when the visible sensor 30 is not able to detect the article Wa continuously three times or more, it may be possible to change the setting in which the abnormality alarm is output.

As described above, in the present invention, different types of articles are stored in each of the plurality of storage units 12*a* and 12*d*. Furthermore, the supply amounts of the different types of articles can be individually controlled by the open/close stoppers 14*a* to 14*d*. Therefore, desired types of articles can be supplied to the downstream of the partition/passing-through members 15*a* to 15*d* by a required number.

In the related art, since a plurality of types of articles are stored in a common storage unit, a position in which undesired types of articles pass through the partition/passing-through member may occur. Therefore, in the related art, it is necessary to continuously rotate a table until desired articles pass through the partition/passing-through member.

However, in the present invention, since different types of articles can be stored in each of the plurality of storage units 12*a* and 12*d*, when the table 11 is operated, desired articles are supplied to the downstream of the partition/passing-through members 15*a* to 15*d*. Consequently, in the present invention, it is possible to shorten a cycle time as compared with the related art.

Moreover, in the present invention, the open/close stoppers 14*a* to 14*d* are used, so that it is possible to control undesired types of articles not to be supplied to the downstream of the partition/passing-through members 15*a* to 15*d*. Furthermore, since the article stoppers 18*a* and 18*b* exist, even though the table 11 has further rotated, no articles return to the lower portions of the storage units 12*a* to 12*d*. As a consequence, the surfaces and the like of such articles are prevented from unnecessarily damaged.

Moreover, in an embodiment (not illustrated), the table 11 may be excluded, and a plurality of linear conveyors may be juxtaposed to one another and may be used as the supply paths 13*a* to 13*d*. In this case, since respective distances of the plurality of supply paths become equal to one another, it is possible to reduce a variation in the supply amount of articles in each supply path.

In addition, although not described in detail, in the case of using the third partition/passing-through member 15*c* and the fourth partition/passing-through member 15*d*, it is sufficient if the table 11 is rotated clockwise by the driving motor 17. Also in such a case, it is apparent that effects similar to the aforementioned effects are obtained.

Advantageous Effects of Invention

In a first aspect, the supply amounts of different types of articles stored in each of a plurality of storage units are individually controlled by the open/close stoppers. Therefore, desired types of articles can be supplied to the downstream side of a partition/passing-through member by a required number. Consequently, it is not necessary to allow a table and the partition/passing-through member to relatively move with each other until desired types of articles are supplied, so that it is possible to shorten a cycle time. Moreover, undesired types of articles can be prevented from being supplied, so that the surfaces and the like of such articles are not damaged.

Furthermore, since a plurality of supply paths are aggregated on the table, it is not necessary to prepare a plurality of article supply devices corresponding to the types of articles, so that it is possible to create an entire system at low cost.

In a second aspect, since no mechanism for positioning articles is necessary, it is possible to simplify an entire configuration of a system.

In a third aspect, since a robot is used, it is possible to flexibly cope with a change in an extraction position and an orientation of an article.

In a fourth aspect, since article stoppers exist, articles having passed through the partition/passing-through member are prevented from being returned to the storage units. As a consequence, the surfaces and the like of such articles are prevented from being damaged.

In a fifth aspect, no thrust of an open/close stopper is transferred to articles, and the articles can pass through a plurality of pins. Therefore, the surfaces and the like of such articles are not damaged, and the articles can be continuously supplied.

In a sixth aspect, gas is injected to a plurality of articles brought into contact with one another or adjacent to one another and a plurality of meshed articles, so that these articles are dispersed. Consequently, the plurality of meshed articles are prevented from being clogged in a gap of the partition/passing-through member.

In a seventh aspect, since it is not necessary to use the detection result of a sensor in order to inject gas, it is possible to simplify an entire configuration of the system.

In an eighth aspect, since gas is injected using the detection result of the sensor, the injection amount of gas and an operation of a driving unit are minimized. Therefore, it is possible to shorten a cycle time.

In a ninth aspect, since extraction positions of articles of each of the plurality of supply paths can be aggregated, it is possible to miniaturize an article supply device.

In a tenth aspect, since respective distances of the plurality of supply paths become equal to one another, it is possible to reduce a variation in the supply amount of articles in each supply path.

In an eleventh aspect, since the driving unit is a servo motor, the control of a rotation position and a high speed operation become possible.

While the present invention has been described using an exemplary embodiment, it should be understood to those skilled in the art that the aforementioned modification and various types of other modification, omission, and addition can be made without departing from the scope of the present invention.

The invention claimed is:

1. An article supply device comprising:
a plurality of storage units in which a plurality of types of articles are respectively stored;
a plurality of supply paths that communicate with the plurality of storage units, respectively;
a plurality of open/close stoppers that each move between open and closed positions to control supply amounts of articles, which are to be supplied from each of the plurality of storage units to each of the plurality of supply paths, for each supply path, wherein, in the open position of each stopper, a first article having a predetermined size is permitted to travel downstream of the open stopper, and in the closed position of each stopper, the first article is prevented by the stopper from travelling downstream of the closed stopper;
a plurality of partitions that form gaps depending on the types of the articles to be supplied to each of the plurality of supply paths, between surfaces of the supply paths and the plurality of partitions at a downstream side of each of the plurality of open/close stoppers in a supply direction of the articles;
a driving unit that allows the plurality of supply paths and the plurality of partitions to move relative to each other; and
a plurality of pins adjacent to front ends of the open/close stoppers, each pin being vertically juxtaposed with respect to surfaces of the supply paths and configured to slide in a vertical direction with respect to the open/close stoppers, such that when an open/close stopper is moved downward and a pin of the plurality of pins contacts an article that is positioned beneath the pin, the pin is configured to move upward with respect to the open/close stopper to avoid interfering with the article.

2. The article supply device according to claim 1, wherein at least one of type, positions, and orientations of the articles supplied to downstream of the plurality of partitions is detected by an optical sensor.

3. The article supply device according to claim 1, wherein the articles supplied to downstream of the plurality of partitions are extracted by a robot.

4. The article supply device according to claim 1, further comprising: article stoppers provided to each of the plurality of supply paths at downstream of the plurality of partitions and block the articles.

5. The article supply device according to claim 1, further comprising: a gas injection unit that injects gas to the articles on the supply path in at least one of upstream and downstream of the partitions.

6. The article supply device according to claim 5, wherein a timing at which the gas injection unit injects the gas is controlled by a timer.

7. The article supply device according to claim 5, wherein a timing at which the gas injection unit injects the gas is controlled by an optical sensor that detects at least one of type, positions, and orientations of the articles supplied to downstream of the plurality of partitions.

8. The article supply device according to claim 1, wherein the plurality of supply paths are configured to have a concentric arc type with each other.

9. The article supply device according to claim 1, wherein the plurality of supply paths are a plurality of linear conveyors juxtaposed to one another.

10. The article supply device according to claim 1, wherein the driving unit is a servo motor.

11. The article supply device of claim 1, wherein each partition forms a predetermined vertical gap between a surface of one of the supply paths upon which the articles are positioned and a lower edge of the partition, wherein the predetermined vertical gap is sized such that, in one orientation of the articles, the articles pass through the gap and under the lower edge of the partition, and, in another orientation of the articles, the articles do not pass through the gap and under the lower edge of the partition.

* * * * *